(12) United States Patent
Hogg, Jr. et al.

(10) Patent No.: US 8,121,264 B1
(45) Date of Patent: Feb. 21, 2012

(54) PROTECTED DATA CONTAINER FOR STORING DATA RELATING TO RECORDED CALLS IN A MANNER THAT ENABLES THE DATA TO BE AUTHENTICATED

(75) Inventors: John S. Hogg, Jr., Bedford, TX (US); Christopher R. McFarlen, Coppell, TX (US); Justin E. Good, Plano, TX (US)

(73) Assignee: Securus Technologies, Inc., Dallas, TX (US)

( * ) Notice: Subject to any disclaimer, the term of this patent is extended or adjusted under 35 U.S.C. 154(b) by 1491 days.

(21) Appl. No.: 11/603,923

(22) Filed: Nov. 22, 2006

(51) Int. Cl.
H04M 1/64 (2006.01)

(52) U.S. Cl. ............... 379/88.22; 370/260; 379/88.01; 379/88.08; 379/88.19; 379/202.01; 379/207.01; 455/412.1; 455/414.1

(58) Field of Classification Search .......... 370/259–271, 370/351–356; 379/67.1–88.28, 90.01, 111–140, 379/201.01, 202.01–207.01; 455/412.1–417, 455/426.1, 426.2, 550.1–560; 704/270–278
See application file for complete search history.

(56) References Cited

U.S. PATENT DOCUMENTS

| | | | | |
|---|---|---|---|---|
| 5,559,875 | A * | 9/1996 | Bieselin et al. | 379/202.01 |
| 6,298,129 | B1 * | 10/2001 | Culver et al. | 379/202.01 |
| 6,647,096 | B1 | 11/2003 | Milliorn et al. | |
| 6,651,042 | B1 * | 11/2003 | Field et al. | 704/270 |
| 6,665,376 | B1 * | 12/2003 | Brown | 379/85 |
| 6,766,000 | B2 * | 7/2004 | Squibbs et al. | 379/88.23 |
| 6,937,706 | B2 | 8/2005 | Bscheider et al. | |
| 6,987,841 | B1 * | 1/2006 | Byers et al. | 379/88.17 |
| 7,058,163 | B1 * | 6/2006 | Parekh et al. | 379/85 |
| 7,079,637 | B1 | 7/2006 | McNitt et al. | |
| 7,133,831 | B2 * | 11/2006 | Brown et al. | 704/275 |
| 7,140,043 | B2 * | 11/2006 | Choi et al. | 726/26 |
| 7,861,088 | B1 * | 12/2010 | Brothers | 713/178 |
| 2003/0056101 | A1 * | 3/2003 | Epstein | 713/176 |
| 2004/0006701 | A1 * | 1/2004 | Kresina et al. | 713/189 |
| 2005/0141678 | A1 * | 6/2005 | Anders | 379/67.1 |
| 2007/0036283 | A1 * | 2/2007 | Shaffer et al. | 379/67.1 |
| 2007/0133437 | A1 * | 6/2007 | Wengrovitz et al. | 370/260 |
| 2007/0280209 | A1 * | 12/2007 | Ramani | 370/356 |

OTHER PUBLICATIONS

U.S. Appl. No. 10/135,878, filed Apr. 29, 2002.
U.S. Appl. No. 10/720,848, filed Nov. 24, 2003.
U.S. Appl. No. 11/334,522, filed Nov. 8, 2006.
U.S. Appl. No. 11/603,938, filed Nov. 22, 2006.

* cited by examiner

Primary Examiner — Hemant Patel
(74) Attorney, Agent, or Firm — Fogarty, L.L.C.

(57) ABSTRACT

Data related to a call is stored to a container in a manner that enables the data to be authenticated. "Container" refers to any type of data structure for storing data, such as a file, database, etc. Thus, a protected container is provided to which captured information relating to a call (e.g., recorded audio of the call, captured application data, captured external data, etc.) is stored. The protected container enables detection of any tampering of the protected data, as well as authentication of such data. A multi-channel recording technique is used to record audio for each outbound channel of a call. Each channel of the audio may be watermarked, and a signature may be generated for use in authenticating the audio data. Information relating to the call (e.g., captured audio, application data, external data, etc.) is captured and streamed into the protected container during the call (i.e., in real time).

36 Claims, 5 Drawing Sheets

PROTECTED DATA CONTAINER FOR STORING DATA RELATING TO RECORDED CALLS IN A MANNER THAT ENABLES THE DATA TO BE AUTHENTICATED

CROSS-REFERENCE TO RELATED APPLICATIONS

This application is related to concurrently filed and commonly assigned U.S. patent application Ser. No. 11/603,938 titled "SYSTEM AND METHOD FOR MULTI-CHANNEL RECORDING"; U.S. patent application Ser. No. 10/135,878, filed Apr. 29, 2002 titled "INFORMATION MANAGEMENT AND MOVEMENT SYSTEM AND METHOD"; Ser. No. 10/720,848, filed Nov. 24, 2003, titled "INFORMATION MANAGEMENT AND MOVEMENT SYSTEM AND METHOD"; Ser. No. 10/420,585 filed Apr. 22, 2003, titled "SYSTEM AND METHOD FOR DETECTING UNAUTHORIZED CALL ACTIVITY"; and Ser. No. 11/334,552 filed Jan. 18, 2006, titled "SYSTEM AND METHOD FOR KEYWORD DETECTION IN A CONTROLLED ENVIRONMENT FACILITY USING A HYBRID APPLICATION"; also, U.S. Pat. No. 7,058,163, titled "SYSTEM AND METHOD FOR EX POST FACTO PRESERVING A RECORDED CONVERSATION"; the disclosures of which are hereby incorporated herein by reference.

TECHNICAL FIELD

The following description relates generally to protected data that can be authenticated, and more particularly to systems and methods for generating a protected data container, such as a file, that has data relating to recorded calls stored therein.

BACKGROUND OF THE INVENTION

Correctional facilities have traditionally recorded telephone conversations of its inmates. Such recordings may be conducted pursuant to a variety of rules that range anywhere from only recording conversations of calls made to specific telephone numbers, calls made by specific inmates or made using specific telephones, to recording every single call. Various techniques for recording telephone calls are known. Examples of known recording techniques include those described in U.S. Pat. No. 6,647,096 titled "SYSTEM AND METHOD FOR REMOTELY CONTROLLING AUTOMATED CALL PLACEMENT CALL MONITORING FUNCTIONS," U.S. Pat. No. 6,665,376 titled "SELECTIVELY ACTIVATED INTEGRATED REAL-TIME RECORDING OF TELEPHONE CONVERSATIONS WITH AUTOMATED DOCUMENTATION OF CONSENT TO CALL RECORDING," and those described in U.S. Pat. No. 7,058,163 titled "SYSTEM AND METHOD FOR EX POST FACTO PRESERVING A RECORDED CONVERSATION", the disclosures of which are hereby incorporated herein by reference.

Some audio recordings are made on wire susceptible to magnetization or on magnetic tape. Audio recordings are also made by passing the audio through an analog-to-digital converter (ADC) and by storing digital data in a digital storage medium such as a magnetic hard disk, a semiconductor memory, or optical or magneto-optical storage such as a writable CD-ROM. Further, in certain instances, the audio is communicated in digital form over a communication network (e.g., as with Voice over IP (VOIP)), wherein the digital audio may be captured and stored to a digital storage medium.

Thus, recording of inmate telephone calls is well known. Such recordings may be monitored by appropriate authorities to detect information regarding the security of facilities, continuing or past criminal activity, etc. Monitoring of the recordings may be performed manually (e.g., by a person listening to the recording) and/or may be performed robotically (or autonomously) by, for example, computer processing logic for analyzing the recordings for certain keywords, etc. In some instances, the recordings may be stored for later use, such as for later investigations, later used as evidence in a court of law, etc.

For many uses, such as when being used as evidence in a court of law, it is desirable to establish the authenticity of recorded calls. Common practices for establishing authenticity and preserving a "chain of custody" of tangible evidence (e.g. a weapon, item of clothing, collected body fluid, etc.) are well known. In general, each step of handling the tangible evidence from collection of the evidence to the proffer of evidence in a courtroom must be attested to by a witness, typically a police officer, a detective, a crime scene investigator, or a laboratory technician. When the evidence is not being actively handled by anyone, it is typically placed in a sealed physical container and stored to an evidence storage facility (e.g., evidence locker). The physical container is typically initialed, dated, and secured in a fashion that is intended to show that no tampering of the evidence took place during its storage.

When desiring to proffer recordings of telephone calls as evidence, the issue of authentication must be addressed, as with traditional tangible evidence. Establishing the authenticity of a recording of a telephone call presents certain difficulties not present for establishing the authenticity of tangible evidence. It is well known that analog recordings and digital data files are readily modified in ways that may be very difficult to detect afterwards. For example, recordings are typically stored to a file having a standard audio file format, such as a WAV or an AU audio file format. These file formats are so well known that it raises an increased risk of a user editing a recording in some way, and within the file format there is nothing to prove the authenticity of the audio (i.e., to prove that the audio has not been altered). Some of the file formats contain additional information in headers to further identify what the content of the file is, but there is nothing to prevent the editing of this header information or to prove that the header information has not been modified.

When the authenticity is put into question, it may be desirable to prove that a recording of a telephone call has not been tampered with or altered, and that it thus accurately reflects the audio of the telephone call. Such a desire may arise in a variety of contexts and for a variety of recorded calls, such as with financial transactions conducted via telephone, conversations of inmates of correctional facilities conducted via telephone, governmental wiretaps, etc.

BRIEF SUMMARY OF THE INVENTION

The present invention is directed to a system and method in which data related to a call is stored to a container in a manner that enables the data to be authenticated. As used herein, the term "container" is used broadly to refer to any type of data structure for storing data, such as a file, database, etc. Thus, embodiments of the present invention provide a protected container to which captured information relating to a call (e.g., recorded audio of the call, captured application data, captured external data, etc.) is stored. The protected container enables detection of any tampering of the protected data, as well as authentication of such data. In certain embodiments, watermarking is used to enable detection of tampering of the recorded data, and a signature-based authentication technique is used to authenticate the data.

In certain embodiments, a multi-channel recording technique is used to record audio for each outbound channel of a call. Each channel of the audio may be watermarked, and a signature may be generated for use in authenticating the audio data. In certain embodiments, information relating to the call (e.g., captured audio, application data, external data, etc.) is captured and streamed into the protected container during the call (i.e., in real time). That is, as the data is captured for the call it is streamed for protection processing (e.g., watermarked for detecting tampering, a signature generated for authenticating the data, etc.), and is stored to the container.

In certain embodiments, the container is generated via non-proprietary protection techniques (e.g., using open standards). Further, in certain embodiments, the container is structured such that it enables processing of protected data contained therein, such as searching for certain keywords in the audio data, etc., without destructing the authenticity of the protected data. In certain embodiments, further data resulting from post-processing of the recorded data for a call can also be stored to the container, such as keyword detection, storage auditing, etc.

According to embodiments of the present invention, embodiments of a protected container are disclosed that provide a suitable mechanism for satisfying the authenticity requirements for submitting such data contained therein as evidence in a court proceeding.

Embodiments of the present invention have particular applicability within controlled-environment facilities for recording calls between a resident and other parties. Examples of controlled-environment facilities include correctional facilities (e.g., municipal jails, county jails, state prisons, federal prisons, military stockades, juvenile facilities, detention camps, and home incarceration environments), healthcare facilities (e.g., hospitals, nursing homes, mental health facilities, and rehabilitation facilities, such as drug and alcohol rehabilitation facilities), restricted living quarters (e.g., hotels, resorts, camps, dormitories, and barracks), and the like. Certain controlled-environment facilities may be thought of as a small community or city, perhaps walled or otherwise access restricted, wherein various activities occur within the community and between the community and those outside the community in the daily operation thereof. Such a community may include a number of individuals and enterprises directly associated therewith, including management, staff, and inmates, residents, patients, or guests (herein referred to as "residents"), and a number of individuals and enterprises indirectly associated therewith, including friends and family of residents, vendors, government agencies, providers of services to residents, and individuals with a connection to the facility or its residents. Of course, as those of ordinary skill in the art will recognize, while embodiments the present invention have particular applicability to controlled-environment facilities (because such facilities often have a desire to record calls), the concepts disclosed herein may likewise be employed in other environments.

Embodiments of the present invention can be applied for recording various types of calls. As used herein, except where accompanying language expressly specifies otherwise, a "call" is intended to broadly refer to any communication between two or more parties which can be recorded. Thus, a "call" is not limited to telephony calls, but also encompasses various other types of communication. In certain embodiments of the present invention, the call being recorded is substantially a real-time communication between the parties (e.g., as in telephony calls). Further, a telephony call is not limited to calls that are transmitted over a public-switched telephone network, but rather a telephony call may refer to a voice call carried in whole or in part over a packet-switched network, such as a voice-over-IP (VoIP) call, a call conducted locally within a facility (e.g., as with known visitation telephones commonly used in correctional facilities), etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
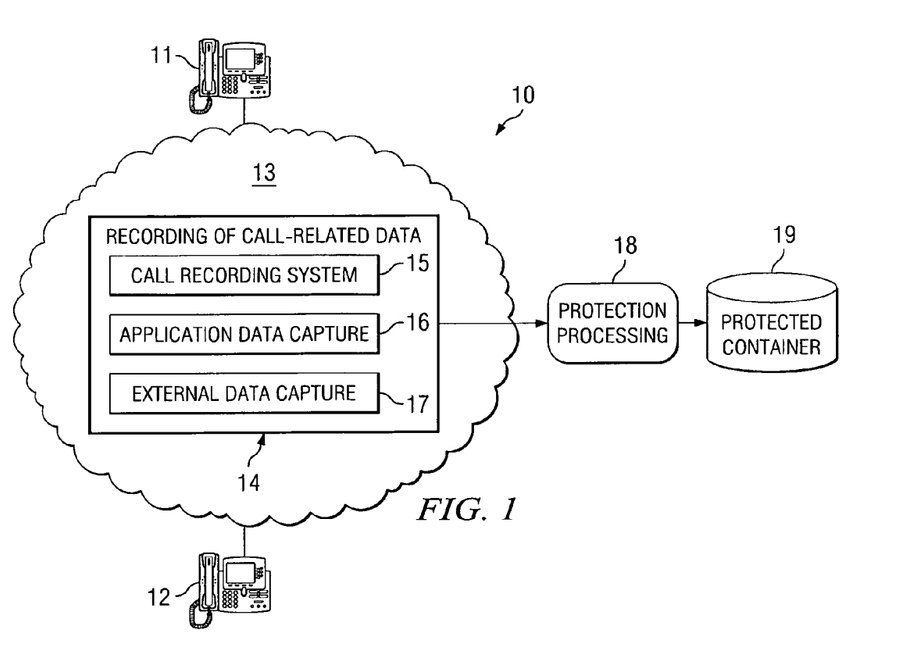
FIG. 1 shows an exemplary system according to one embodiment of the present invention.

FIG. 1 shows an exemplary system 10 according to one embodiment of the present invention. System 10 comprises a first communication device 11 and a second communication device 12, which are operable to communicate with each other. While two communication devices are shown for simplicity in this example, any number of communication devices may participate in a call according to embodiments of the present invention. In this example, first and second communication devices 11 and 12 are shown as telephones; although as discussed further herein, embodiments of the present invention are not limited in application to telephony communication devices. For instance, communication devices 11 and 12 may be any communication devices that enable users thereof to audibly communicate with each other.

System 10 also comprises a call processing system 13, which is operable to process a call. Call processing system 13 may comprise a communication network over which communication of the call is transmitted, such as a public-switched telephone network (PSTN), packet-switched network (e.g., the Internet), a wireless network, etc. Call processing system 13 may include logic to perform various types of processing on a call, including billing the call, performing checks to ensure that the call is authorized (e.g., in the context of a correctional facility, an inmate may not be authorized to place certain calls, such as calls to judges, victims, etc.), monitoring for unauthorized events during the call (e.g., in certain environments, such as in correctional facilities, certain enhanced telephony activities such as three-way calling are not permitted), etc.

In this example, call processing system 13 includes call monitoring logic 14 for capturing various data relating to a call. For instance, in this example logic 14 includes a call recording system 15, an application data capture system 16, and an external data capture system 17. As shown, according to embodiments of the present invention, protection processing logic 18 is further provided which is operable to store captured data relating to a call (e.g., captured by call recording system 15, application data capture system 16, and external data capture system 17) to a protected container 19. Container 19 is a data structure (e.g., file, database, etc.) in which the captured data is organized, wherein such data structure is stored to a computer-readable data storage medium. Such a computer-readable data storage medium may be any suitable computer-readable data storage medium now known or later developed for storing data, including without limitation disk drive, memory (e.g., random access memory (RAM)), floppy disk, optical disk, Compact Disc (CD), Digital Versatile Disc (DVD), and other data storage devices. As described further herein, protected container 19 has the captured data stored thereto in a manner that enables such data to be authenticated. That is, according to embodiments of the present invention, container 19 enables detection of any modification of the data after it has been stored to the container 19.

Thus, according to embodiments of the present invention, provide a protected container to which captured information relating to a call (e.g., recorded audio of the call, captured application data, captured external data, etc.) is stored. The protected container enables detection of any tampering of the protected data, as well as authentication of such data. Accordingly, the protected container provides a suitable mechanism for satisfying the authenticity requirements for submitting such data contained therein as evidence in a court proceeding. In certain embodiments, such information relating to the call is streamed into the protected container during the call (i.e., in real time). That is, as the data is captured for the call it is streamed for protection processing (e.g., watermarked for detecting tampering, a signature generated for authenticating the data, etc.), and is stored to the container. In certain embodiments, the container is generated via non-proprietary protection techniques (e.g., using open standards). Further, in certain embodiments, the container is structured such that it enables processing of protected data contained therein, such as searching for certain keywords in the audio data, etc., without destructing the authenticity of the protected data. In certain embodiments, further data resulting from post-processing of the recorded data for a call can also be stored to the container, such as keyword detection, storage auditing, etc.

Figure 2:
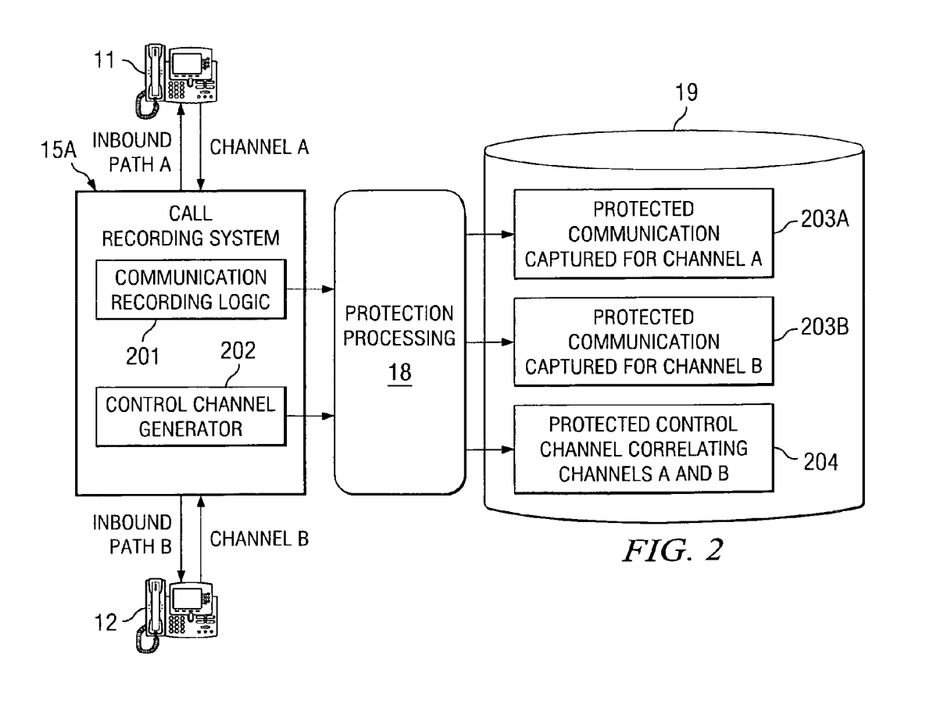
FIG. 2 shows an exemplary system according to one embodiment of the present invention which utilizes a multi-channel recording of communication of a call.

According to certain embodiments, the call recording system 15 utilizes a multi-channel recording of communication of a call. For instance, FIG. 2 shows an exemplary system 20 according to one such embodiment of the present invention. As with exemplary system 10 of FIG. 1, system 20 comprises first communication device 11 and second communication device 12, which are operable to communicate with each other. Again, while two communication devices are shown for simplicity in this example, any number of communication devices may participate in a call according to embodiments of the present invention. Also, while the first and second communication devices 11 and 12 are shown as telephones in this example, embodiments of the present invention are not limited in application to telephony communication devices.

System 20 shows an exemplary implementation of call recording system 15 of FIG. 1, which is designated as call recording system 15A in FIG. 2. Call recording-system 15A includes communication recording logic 201 and control channel generator 202. As described further below, communication recording logic 201 is operable to record communication for multiple channels of a call, while control channel generator 202 generates a control channel that correlates the recorded communications of the multiple channels.

Thus, according to embodiments of the present invention, a multi-channel call recording system 15A is provided. For instance, each party to a call may be assigned a corresponding channel, and independent recordings of communication on each channel are captured. In the example of FIG. 2, each of communication devices 11 and 12 have an inbound channel (or inbound path) and an outbound channel (or outbound path); and the outbound channel of each device is independently recorded by communication recording logic 201. For example, in FIG. 2, the outbound channel of communication device 11 is designated "channel A," and an inbound path for communication device 11 is shown as inbound path A. Likewise, the outbound channel of communication device 12 is designated "channel B," and the inbound path for communication device 12 is shown as inbound path B. Communication recording logic 201 records communication (e.g., audio) captured for channel A (i.e., the outbound path of communication device 11) to a data storage medium (e.g., temporary storage) as discussed further herein. Similarly, communication recording logic 201 records communication (e.g., audio) captured for channel B (i.e., the outbound path of communication device 12) to a data storage medium (e.g., temporary storage) as discussed further herein.

According to an embodiment of the present invention, protection processing is performed on the captured communication for each of channels A and B, thus resulting in protected communication 203A and 203B that is recorded in container 19 for channels A and B, respectively. Accordingly, independent protected recordings 203A and 203B are recorded for channels A and B, respectively. Thus, in the illustrated example, audio from telephone 11 is recorded to container 19 as protected recording 203A, while audio from telephone 12 is recorded to container 19 as protected recording 203B. In certain embodiments, the audio from multiple channels are written in real time as a recording of a call is made. The payload portion of the channels is used in the signing in the time order they are appended to the file. Thus, according to one embodiment, the audio of such channels A-B is a continuous bit stream. According to certain embodiments, the audio channels are individually watermarked. Such watermarking enables detection of whether any portion of the audio has been tampered with. Various watermarking techniques are known, and any watermarking technique now known or later developed may be used. For example, various strong watermarking techniques and fragile watermarking techniques are known. Strong watermarks may be very difficult to remove from a watermarked audio recording, such that the watermark may be discernable even if the audio is edited or converted into a different format, etc. Such a watermark enables detection that the audio under analysis originated from a particular audio recording that was originally marked with the corresponding watermark that is discernable in the audio under analysis. Preferred embodiments of the present invention utilize a fragile watermark, wherein the watermark is damaged at a corresponding portion of an audio file if such portion of the audio file is modified in any manner. This enables a detection of any portion of the audio file that has been modified.

While the audio of each channel is shown in FIG. 2 as separate protected recordings 203A and 203B, in certain embodiments the audio channels are multiplexed and compressed (e.g., using a Free Lossless Audio Codec ("FLAC")) into a single bit stream, as in the example discussed further below with FIG. 6. Thus, in certain embodiments, each of the independent audio channels captured for a call may be identifiable within a single bit stream into which the audio channels are compressed.

During the call, control channel generator 202 generates a control channel comprising information for correlating the recorded communication of channels A and B. In this embodiment, the generated control channel is also processed by protection processing 18, and the resulting protected control channel 204 is stored to container 19. The generated control channel may, for example, include information for enabling time-wise correlation of the recorded audio recorded for each of channels A and B.

Exemplary embodiments of a call recording system that records multiple channels of a call and generates a control channel for correlating the recorded channels are described further in currently filed and commonly assigned U.S. patent application Ser. No. 11/603,938 titled "SYSTEM AND METHOD FOR MULTI-CHANNEL RECORDING," the disclosure of which is hereby incorporated herein by reference. As described further in the above-referenced co-pending patent application, such a multi-channel recording system enables a reviewer (a human reviewer, a robotic reviewer, or both) to review the call from any desired perspective. For instance, a reviewer may analyze each of channels A and B independently. Thus, the reviewer may review all audio of the call (including background audio) outbound from telephone 11 via channel A by analyzing the protected recorded communication 203A. Similarly, the reviewer may review all audio of the call (including background audio) outbound from telephone 12 via channel B by analyzing the protected recorded communication 203B. Further, the control channel 204 may be used to correlate the audio recorded for each communication channel to enable the reviewer to analyze the call from an eavesdropper's perspective.

Figure 3:
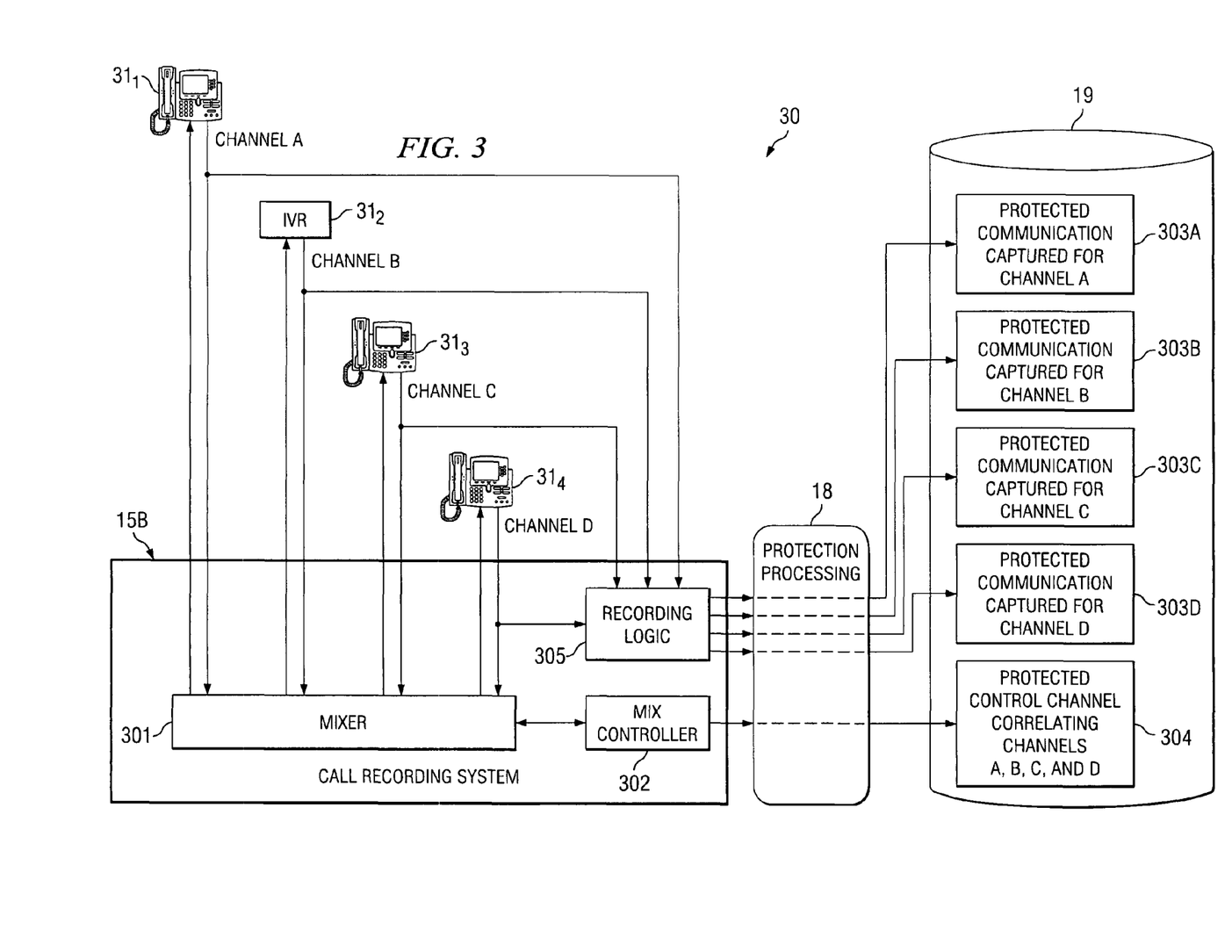
FIG. 3 shows an exemplary system 30 according to one embodiment of the present invention.

FIG. 3 shows an exemplary system 30 according to one embodiment of the present invention. System 30 comprises communication devices $31_1$, $31_2$, $31_3$, and $31_4$, which are operable to communicate with each other. In this example, communication devices $31_1$, $31_3$, and $31_4$ are shown as telephones; although as discussed further herein, embodiments of the present invention are not limited in application to telephony communication devices. Communication device $31_2$ is an IVR that participates on a call. Thus, various parties may participate on a call via communication devices $31_1$-$31_4$ (note that IVR $31_2$ is considered a party to the call). While four communication devices are shown in this example for participating on a call, any number of communication devices may participate during a given call in certain embodiments, and embodiments of the present invention are not limited as to the number of communication devices that may be participating on a call.

System 30 also comprises an exemplary implementation of call recording system 15 of FIG. 1, which is designated as call recording system 15B in FIG. 3. This exemplary implementation of call recording system 15B includes a mixer 301 that controls who hears what at a given point in time. That is, mixer 301 controls which parties to a call are coupled to outbound audio of which other parties. In other words, mixer 301 controls the communicative coupling of various inbound and outbound paths of parties to a call. For example, an originating party may use telephone $31_1$ to place a collect call to a called party at telephone $31_3$. When the called party answers telephone $31_3$, IVR $31_2$ may interrupt the call and mixer 301 may switch the originating party out of the communication such that the originating party cannot hear via telephone $31_1$ the communication between IVR $31_2$ and the telephone $31_3$. IVR $31_2$ may inform the called party of the collect call from the originating party and ask the called party if he accepts the charges for the call. If the originating party accepts the charges, then mixer 301 may communicatively couple the telephones $31_1$ and $31_3$ to each other such that the originating party can receive via telephone $31_1$ communication from telephone $31_3$ and vice-versa. That is, if the called party accepts the charges for the call, mixer 301 may communicatively couple the inbound path of telephone $31_1$ with the outbound path of telephone $31_3$, and communicatively couple the inbound path of telephone $31_3$ with the outbound path of telephone $31_1$.

In the example illustrated in FIG. 3, a further party conferences into the call and participates via telephone $31_4$. IVR $31_2$ may interact with one or more of the parties when setting up such conference call, and mixer 301 may selectively couple the inbound and outbound paths of the various communication devices $31_1$-$31_4$ during the course of establishing the conference call, as may be desired. Further, once established, mixer 301 may communicatively couple the inbound channels of each of telephones $31_1$ and $31_3$-$31_4$ with the outbound channels of each other of telephones $31_1$ and $31_3$-$31_4$. Of course, during the call, mixer 301 may selectively change such coupling (e.g., a message from IVR $31_2$ may be generated to one or more of the parties, such as to inform them of a permitted amount of time remaining for the call, etc.), to add new couplings to parties being added to the call, and/or to remove couplings of parties dropping off the call. Thus, not all parties to call have their recordings started at what is designated as "time mark zero" (i.e., the beginning of the recording) for the call. Throughout the call, the recording progresses from time mark zero to "time mark N" at which the call is terminated. The control channel designates those outbound channels of parties to a call that are connected to inbound channels of other parties to the call. Thus, the control channel accurately indicates points at which new parties are added during a call, points at which parties drop off the call, etc.

In this example, a mix controller 302 is provided for controlling the mixer 301. Mix controller 302 may, in certain embodiments, control both the IVR $31_2$ (e.g., to ensure the appropriate messages are played, etc.) and the mixer 301. While mixer 301 and mix controller 302 are shown as separate elements in FIG. 3 for ease of illustration, in certain embodiments such mixer 301 and mix controller 302 may be integrated. Further, recording logic 305 is included for capturing audio from each of the channels of a call.

In this example, each party to the call is assigned a corresponding channel, and independent recordings of communication on each channel are captured. In the example of FIG. 3, each of communication devices $31_1$-$31_4$ have an inbound channel and an outbound channel; and the outbound channel of each device is independently recorded by communication recording logic 305. According to one implementation of the recording logic 305, such recording logic may provide a tap on each one of the outbound channels A-D independently for recording the audio on each individual channel. In this example, the outbound channels of communication devices $31_1$-$31_4$ are designated as channels A, B, C, and D, respectively. Communication recording logic 305 captures communication (e.g., audio) for channel A, which is then protected by protection processing logic 18 and stored to container 19 as protected recorded communication 303A. Similarly, communication recording logic 305 captures communication (e.g., audio) captured for each of channels B-D, which are protected by protection processing logic 18 and stored to container 19 as protected recorded communications 303B, 303C, and 303D, respectively. Accordingly, independent protected recordings 303A-303D are contained in container 19 for channels A-D, respectively. Again, while the audio of each channel is shown in FIG. 3 as separate protected recordings 303A-303D, in certain embodiments the audio channels are multiplexed and compressed (e.g., using a Free Lossless Audio Codec ("FLAC")) into a single bit stream.

Mix controller 302 is operable to adjust the mixer 301 as necessary to control what each of the inbound paths receive. That is, mix controller 302 controls mixer 301 to control which outbound channels of a call each inbound path is communicatively coupled to. Simultaneously, such information indicating which outbound channels each inbound path is communicatively coupled to at a given point during a call is also recorded as a control channel for the call. Thus, mix controller 302 generates control channel 304 in this example. Accordingly, in this example, the outbound paths of each communication device that is a party to a call is independently recorded, and a control channel is also generated which defines which inbound paths are communicatively coupled to which outbound paths at any point during the call. Thus, the call can be accurately re-created from any desired perspective using the independently recorded channels and the corresponding control channel information.

For example, a reviewer desiring to analyze the audio from telephone $31_1$ for a given call in isolation from all other audio on the call, the reviewer may select to analyze the audio of channel A stored as protected recording 303A. In this manner, the reviewer may be able to listen to all of the audio from telephone $31_1$ during the call. Such audio is available irrespective of whether the audio was actually communicated to another party on the call. For instance, the audio may be captured during a time in which the outbound channel of telephone $31_1$ is not communicatively coupled (by mixer 301) to any inbound channels of any other communication devices on the call. Further, background audio at telephone $31_1$ may be included in the recording 303A of channel A, thus allowing the reviewer to more easily hear such background audio without interference from foreground or background audio of other outbound channels B-D on the call and allowing the reviewer to verify from which communication device on the call the background audio is from.

Each of outbound channels B-D may likewise be analyzed in isolation from the other outbound channels is so desired. Further, the reviewer may select to hear the call from the perspective of any party to the call or from the perspective of an eavesdropper to the call. For instance, suppose a reviewer desires to hear the call from the perspective of the telephone $31_1$; in this case, those protected recordings 303B-303D of outbound channels B-D may be combined in accordance with protected control channel 304 to form the audio of the call as heard from the perspective of the telephone $31_1$. For instance, for any given point in the call, it may be determined which of channels B-D are communicatively coupled to the inbound channel of telephone $31_6$ and the audio captured for those channels determined to be coupled to the inbound channel of telephone $31_1$ at such given point in the call are combined to form the audio heard from the perspective of telephone $31_1$ at such given point in the call.

According to one embodiment, a software application is provided with which a user may interact to select a desired perspective for call analysis of a given call, where the software application can, based on the selected perspective, use the control channel for the given call and the recorded communication channels to recreate the desired perspective. Such a software application may be stored to computer-readable medium (e.g., hard disk, memory, floppy disk, optical disc, etc.), and executed by a processor to read the protected recordings for outbound channels of a call (e.g., protected recordings 303A-303D of FIG. 3) and the control channel for such call (e.g., control channel 304 of FIG. 3) to create communication of the call from a desired perspective (e.g., either audio of an isolated channel, or audio heard from a particular party's perspective, etc.) in the manner described above.

Figure 4:
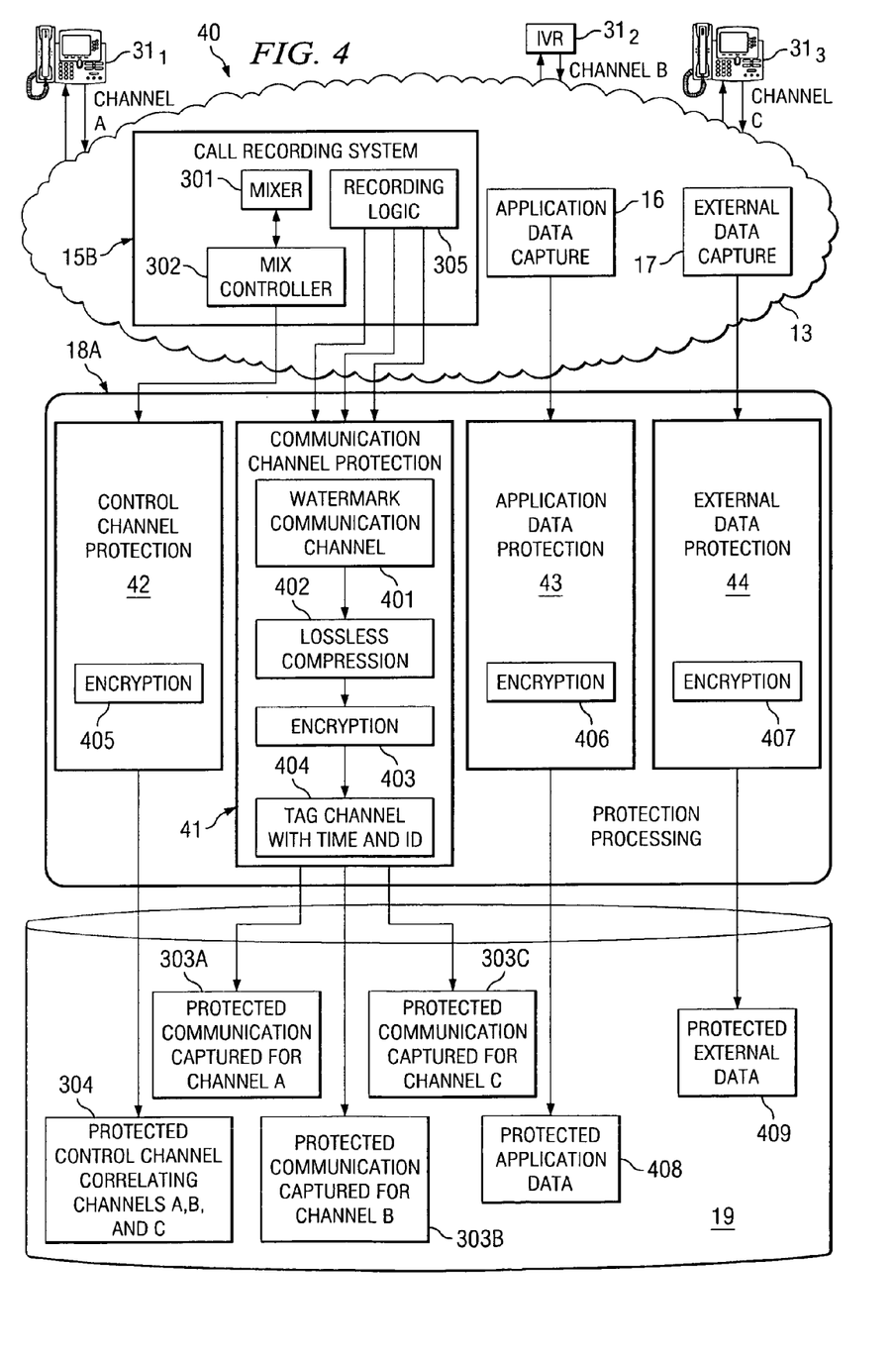
FIG. 4 shows an exemplary implementation of one embodiment of the present invention.

Turning to FIG. 4, an exemplary implementation of one embodiment of the present invention is shown in greater detail. As with FIG. 3, communication devices $31_1$-$31_3$ are again shown, which may each participate on a call. Call processing system 13 includes call recording system 15B described above in FIG. 3, as well as application data capture logic 16 and external data capture logic 17. As discussed above with FIG. 3, during a call recording logic 305 captures audio for each of the outbound channels A-C of devices $31_1$-$31_3$, respectively. An exemplary implementation of protection processing logic 18 according to one embodiment of the present invention is shown in FIG. 4 as protection processing logic 18A. According to this embodiment, the audio captured by recording logic 305 for each of the channels A-C is processed by communication channel protection logic 41 of protection processing logic 18A. Communication channel protection logic 41 includes an operational block 401 for watermarking a communication channel, an operational block 402 for performing lossless compression of the channel's audio, an operational block 403 for performing encryption of the channel's audio, and operational block 404 for tagging the channel with a timestamp and channel identifier. Each of these operational blocks are described further below.

The audio of each of the channels A-C captured by recording logic 305 is passed through communication channel protection logic 41 to result in protected communication 303A-303C stored to container 19. In this example, the audio of channels A-C is compressed into a single protected bit stream that comprises identifiable parts corresponding to the audio captured for each of the respective channels A-C during the call. According to this exemplary embodiment, as recording logic 305 captures audio for a given channel, the audio may be stored (e.g., buffered) to temporary data storage (e.g., memory). The captured audio of each channel is streamed in real time (during the call) to communication channel protection logic 41 for processing. The captured audio for the given channel is then watermarked in operational block 401.

In block 402, the audio for the channels may then be compressed. Preferably, a lossless compression technique is employed, such as that of the well-known FLAC, to compress the multiple audio channels into a single bit stream.

In block 403, the captured audio is encrypted. Any suitable encryption technique that protects the audio using an authenticating signature may be employed, examples of which are described further below with FIG. 6. In operational block 404, the audio of the channel is tagged with a time and identifier ("ID").

As described above with FIG. 3, mix controller 302 generates a control channel, which in this embodiment is input to control channel protection logic 42 of protection processing logic 18A. During the call, the control channel signals are generated for controlling mixer 301, and such control channel signals are input simultaneously to control channel protection logic 42. Control channel protection logic 42 encrypts the control channel in operational block 405. The encryption techniques as described above in block 403 may be used in block 405. The resulting encrypted control channel is stored to container 19 as protected control channel 304.

In certain embodiments, application data capture logic 16 also captures data relating to the call. Exemplary types of application data that may be captured by logic 16 are described with FIG. 6 below. Such application data is input to application data protection logic 43 of protection processing logic 18A. Application data protection logic 43 encrypts the captured application data in operational block 406. The encryption techniques as described above in block 403 may be used in block 406. The resulting encrypted application data is stored to container 19 as protected application data 408.

In certain embodiments, external data capture logic 17 also captures data relating to the call. Examples of such external data that may be captured by logic 17 are described with FIG. 6 below. Such external data is input to external data protection logic 44 of protection processing logic 18A. External data protection logic 44 encrypts the captured external data in operational block 407. The encryption techniques as described above in block 403 may be used in block 407. The resulting encrypted external data is stored to container 19 as protected external data 409.

Figure 5:
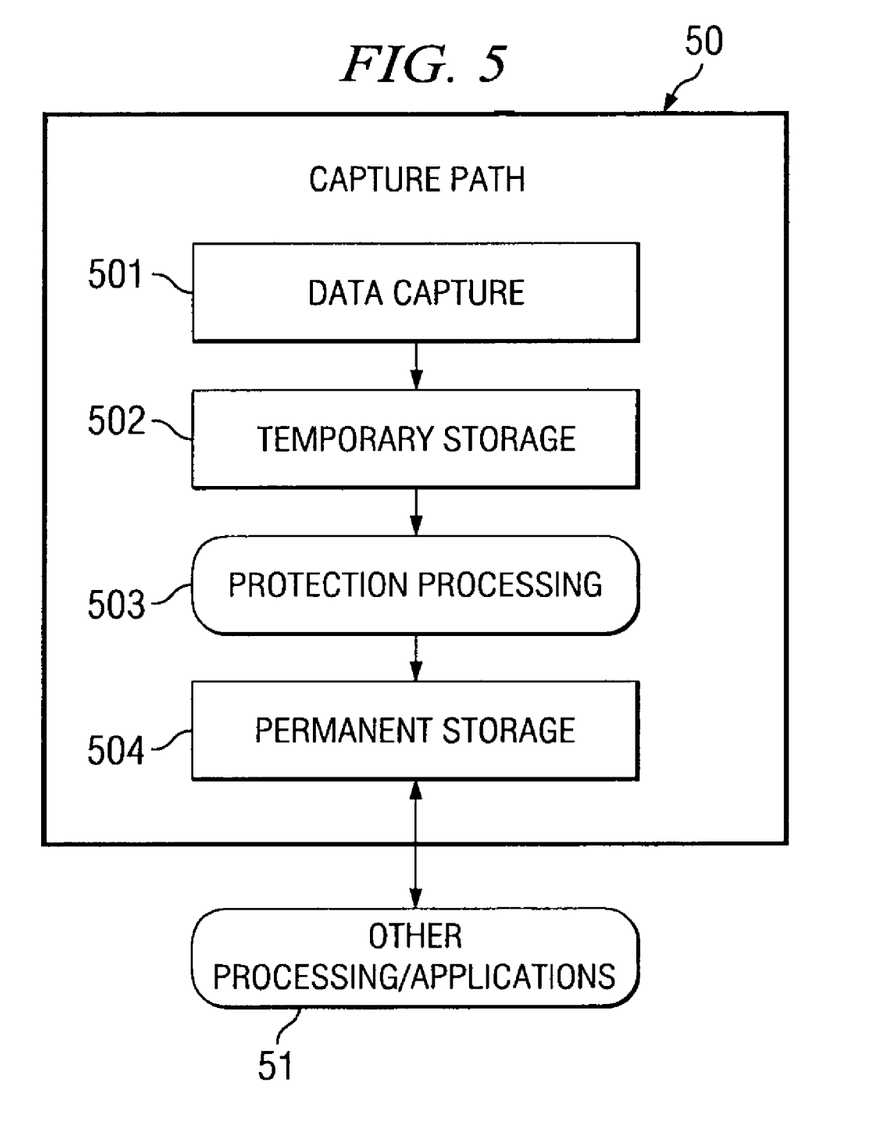
FIG. 5 shows an exemplary capture path for capturing information relating to a call according to an embodiment of the present invention.

FIG. 5 shows an exemplary capture path 50 for capturing information relating to a call according to an embodiment of the present invention. As shown, data (e.g., audio for one or more communication channels, application data, external data, etc.) relating to a call is captured in block 501. As described further herein, all or a portion of such data (e.g., audio) may be captured as streaming data, which is streamed from the capture logic to protection processing logic. According to certain embodiments of the present invention, the audio and/or other information about a call is captured, protected, and then stored to a container before it is accessible for modification by any other party/process. For example, the streaming data (e.g., audio) may be temporarily stored (or buffered) to temporary storage (e.g., memory) in block 502, and streamed to protection processing logic in block 503. The captured data is streamed to the protection processing 503 during the course of an ongoing call, and in some instances the temporary storage in block 502 may be used to manage/control the rate at which the data is streamed to the protection processing-block 503. Protection processing block 503 stores the data in protected form that can be authenticated to a container, and such protected container may be stored to permanent storage, such as hard disk, external disk, optical disc, floppy disk, etc, in block 504. Other parties and processes 51 may then access the stored data. It should be recognized that because the captured data is streamed to the protection processing logic before any other party/process is permitted access thereto, one can be assured that the data (e.g., audio) is not modified before it is protected and stored in the container. Once stored to the container, other parties and processes 51 can access the data in the container, but by that time the data is protected such that it can be determined whether any such party/process 51 modifies the data from its original form as captured. That is, the data contained in the protected container can be later authenticated.

Figure 6:
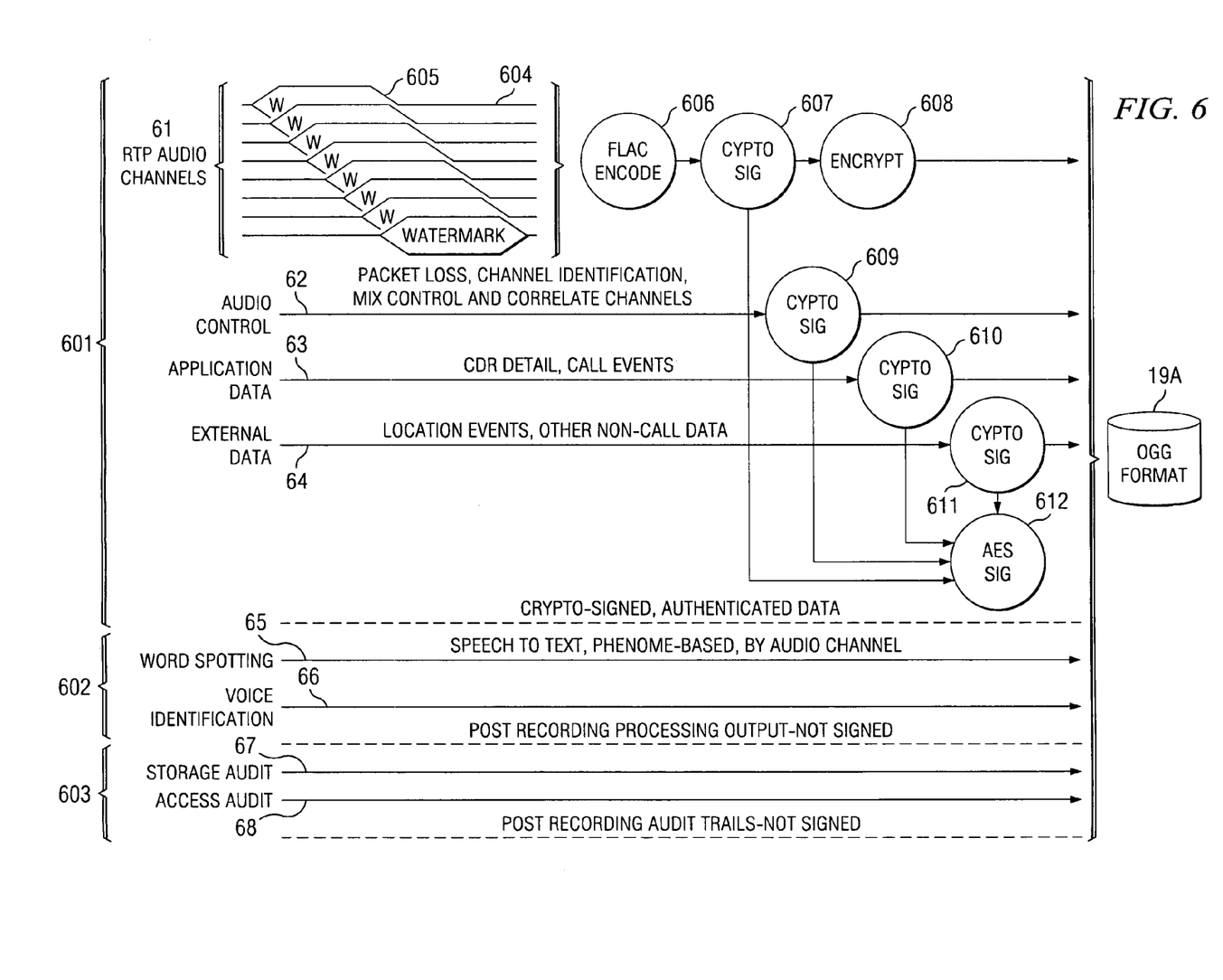
FIG. 6 shows an exemplary data flow of information into a protected container according to one embodiment of the present invention.

FIG. 6 shows an exemplary data flow of information into a protected container according to one embodiment of the present invention. In this example, the container, shown as container 19A, is a streamable container that comprises multiple embedded channels. In this exemplary embodiment, the channels may include one or more of 3 distinct types of channels that are captured for a given call. The first group of channels, designated group 601 in FIG. 6, comprise data that is captured in real time during a call (e.g., via the exemplary capture path 50 of FIG. 5), such as one or more communication channels 61 (e.g., audio channels), control channel information 62 (e.g., mixing information, packet loss information, etc.), application data 63 (e.g., call detail records, call events, etc.), and external data 64 (e.g., location events, etc.). The first group of channels 601 are protected via a key-based signature authentication technique.

A second group 602 and third group 603 may be included, which are each generated by post-processing of a recorded call. That is, groups 602 and 603 are not generated in real time via capture path 50 of FIG. 5, but may instead be generated after the first group of authenticatable channels 601 are stored to the container. In this example, second group 602 includes word spotting information 65, voice identification information 66, speech-to-text conversion information, etc. Third group 603 includes audit information that may be appended if so desired. Such audit information may include events related to storage management and access of the data recorded for the call, such as storage audit information 67 and access audit information 68. That is, such audit information may detail information about storage of the container 19A and whom has accessed the container 19A.

According to one embodiment, container encapsulation used for container 19A is Ogg version 0, which is defined by IETF RFC 3533 (May 2003). Characteristics of such a container include: a) support for multiple logical bitstreams (channels), b) interleaving of logic bit-streams, c) detection of corruption, d) single-pass encoding (for streaming and signing), e) streaming capability, f) support for continuous data (audio) and discontinuous data (e.g., CDR, call event data, etc.), and g) IANA registered MIME type "application/ogg." The multiplexing used in one embodiment is sequential multiplexing with "beginning of stream" markers for authenticated channels and defined audit channels at the time of creation. Any bit-streams that are populated by post-processing (e.g., those of groups 602 and 603) are created at the time of the processing and are not present at the beginning of the container.

According to one embodiment, all channels within the container 19A have assigned identifiers to enable clients and post-processing to easily handle the information. Exemplary identifiers that may be included for each channel are described further below. Preferably, a client or process that encounters an unknown channel does not process it, but is instead able to skip such unknown channel. Preferably, no client or process that is permitted access to the protected container's information alters any information in an existing channel stored to the container, including both Ogg headers and the payload data of such channel. In the event an Ogg container is re-ordered to provide merge in post-processing data that is timing sensitive, the existing channel data is not altered or re-ordered because it will alter the signature.

According to the exemplary embodiment of FIG. 6, upon a call being detected an empty container 19A for the call is generated. In real time (as the call progresses) the channels of group 601 are captured and processed according to the exemplary capture path 50 of FIG. 5. The payload portion of the channels of this first group 601 is used in the signing in the time order they are appended to the file. Group 601 includes one or more audio channels 61 that are captured for a call, such as audio channel 604. According to one embodiment, the audio portion of such channels 61 is a continuous bit stream. The bit stream may include various audio channels. For instance, in one embodiment, the audio bit stream may include up to 8 audio channels of PCM 16 data. Of course, in other embodiments, any number of audio channels may be permitted. According to this exemplary embodiment, the audio channels 61 are individually watermarked. For instance, watermarking 605 is applied for audio channel 604 shown in FIG. 6. Further, in this example, the audio channels 604 are multiplexed and compressed using the FLAC ("Free Lossless Audio Codec") 606 into a single bit stream. In general, FLAC is lossless, meaning that audio is compressed in FLAC without any loss in quality. FLAC is well-known and is freely available and supported on most operating systems, including Windows, UNIX, Linux, *BSD, Solaris, OS X, IRIX, BeOS, OS/2, and Amiga. There are build systems for autotools, MSVC, Watcom C, and Project Builder. The "Free" term in FLAC means that the specification of the format is fully open to the public to be used for any purpose. It also means that all the source code is available under open-source licenses. While FLAC is used in this exemplary embodiment, other lossless audio codecs now known or later developed may be used instead in other embodiments.

Then, according to this embodiment, the current signature 607 for the audio channels 61 is updated. Encryption is then applied in block 608. The resulting protected audio captured for the channels 61 is then stored to container 19A. An Ogg stream serial number may be assigned to such audio data (e.g., serial number XXXXXXX).

The generation of the audio portion (i.e., the audio channels 61) is controlled by a control channel 62 that designates the contents of each stream, source (RTP, file, etc.) and types of audio streams that can be re-generated. In this embodiment, the audio control channel 62 is a discontinuous bit stream of binary packets that comprises: a) audio stream identification including source, b) derived stream identification, c) mixing information for derived streams, d) packet drop and latency information for RTP streams, e) change in watermarking due to more information or call state changes, and f) use of encryption, indication of pass-phrase or public key and a reference to the source of the key. That is, the audio control channel 62 comprises a discontinuous bit stream in which data is streamed from mix controller 302 as appropriate for controlling mixer 301 as discussed above with FIGS. 3-4. A signature 609 is generated for the audio control channel 62.

According to one embodiment, the initial audio control packets appear before any audio data to enable advanced decoding options and information regarding the content. An Ogg stream serial number may be assigned to such control channel 62 (e.g., serial number XXXXXXX). In some cases, the processing of this control channel 62 may be required to listen to an audio stream if the desired content is a derived stream or encryption was used.

According to this exemplary embodiment, application data 63 is received from the control processor during the setup and throughout the duration of the call. In this embodiment, application data 63 is a discountinuous bit stream of XML encoded packets that comprise: a) detail CDR information including contact, site, source, termination, and PIN-related information, b) application-generated events regarding progress of call or actions, c) real-time detected events (e.g., 3-way calling, etc.), and d) audit information regarding any access to the call while it was in progress. A signature 610 is generated for the application data 63.

In certain embodiments, application data 63 is used in the calculation of the watermark 605, and therefore an initial application data packet proceeds data with the minimum information required to authenticate the information. An Ogg stream serial number may be assigned to such application data 63 (e.g., serial number XXXXXXX). The processing of this channel is not required to listen to an audio stream.

External data channel 64 may be used to include information from an external data source that is generated during the recording and is desired to be authenticated within the container 19A. This is a discontinuous bit stream that may comprise, as examples: a) RFID or other location information, b) video image, and c) other feeds that can be received at call time. An Ogg stream serial number may be assigned to such external data 64 (e.g., serial number XXXXXXX). The processing of this channel is not required to listen to an audio stream. A signature 611 is generated for this external data channel 64.

A key signature channel 63 contains information regarding the key used to sign and/or encrypt the data and the signature of the related channels of the first group 601. The initial signature packet is the first packet in the container 19A following the stream identifiers. It includes a "reference" to the source of the key used in signing the container. This is independent of the encryption applied to the audio. Following the "end of stream" markers for the first group 601 streams of channels 61-64 there is a final signature packet that contains the ASCII-encoded signature that covers all the data in streams 61-64 in time order, according to the exemplary embodiment of FIG. 6. An Ogg stream serial number may be assigned to such key signature channel (e.g., serial number XXXXXXX). The processing of this channel is not required to listen to an audio stream.

The recorded audio channels may be processed by computer-executable applications and/or by human users to generate post-processing group 602. for instance, a word spotting application, such as that described in U.S. patent application Ser. No. 11/334,522, the disclosure of which is incorporated herein by reference, may be used to detect keywords of interest that are present in the recorded audio channels 61, thus generating word spotting channel 65. As another example, voice identification techniques, such as the voice printing techniques described in concurrently filed U.S. patent application Ser. No. 11/603,960, the disclosure of which is incorporated herein by reference, may be used to generate voice identification channel 66.

The third group 603 of channels are directed to auditing of the protected container 19A. According to certain embodiments, audit event data is appended to the container 19A when certain events occur. An example of one such event is the transfer of the container 19A to alternate media (e.g., written to CD or DVD). One channel of information included in this group may be storage audit channel 67. The storage management events section is a discontinuous bit stream of XML encoded packets that comprise, for example: source location (system, mount points, type of media, size), destination location (system, mount points, type of media, size), event information regarding initiator and cause of movement, and retention information (if applicable). An Ogg stream serial number may be assigned to such storage audit channel 67 (e.g., serial number XXXXXXX). The processing of this channel is not required to listen to an audio stream. According to one embodiment, the information contained in channel 67 is not protected with a signature-based authentication, as with the channels of the first group 601, and thus the information in channel 67 may be tampered with. Of course in certain embodiments a signature-based authentication technique may be used to protect the information in channel 67, as such information is generated, thereby enabling this channel to also be protected, if so desired.

Another channel included in the third group 603 is access audit channel 68. Channel 68 may include information regarding accesses of container 19A, such as identification of user, date, time, etc., of any accesses of container 19A.

Encryption of the audio data (e.g., in block 608 of FIG. 6) is considered optional in this embodiment. The Recording Format of the exemplary embodiment of FIG. 6 supports two methods available for encryption, secret keys and public keys, the use of each of which are well-known encryption techniques and each have their own advantages and disadvantages. In certain embodiments, the encryption is only applied to the audio channel in the container and only after it has gone through watermarking, compression, and the signature is calculated. This allows access to the data streams and the ability to append audit information without requiring access to the keys.

As an example of an encryption technique that uses public key encryption, a pair of asymmetric keys (i.e., a public key and a private key) are used, which are related in such a way that data encrypted with the public key can only be decrypted using the corresponding private key. This provides a method such that the audio data can be encrypted, stored and transported with one key (e.g., the public key) but cannot be decoded and listened to without access to the corresponding key (e.g., the corresponding private key). When the techniques described herein are employed for recording calls for a controlled-environment facility, such as a correctional facility (e.g., prison), the private key may be retained by the facility and/or third party, whereby access to the recordings is thus controlled by access to the private key.

In one embodiment, the encryption employed is a variation of cipher block chaining that supports streaming and starting mid-stream by allowing decryption with only access to one prior block to establish synchronization (initialization vector. To fully support streaming on web clients, it may be desirable to implement a key server and other infrastructure support. Any suitable technique now known or later developed for performing the encryption may be used in accordance with embodiments of the present invention.

When the above-described public key encryption technique is employed, any post-processing desired on the encrypted data is required to have access to the corresponding private key to perform the decoding function. The use of a public key encoding is available, however not preferred for many implementations, when transferring to a CD or other media. To enable access to the recordings the private key is to be made available to those that are to have access, thereby rendering the private key no longer private. An option, if public key encryption is desired on the initial recording, is providing it to the process that makes the CD/DVD's to allow decryption and re-encryption into a secret key.

According to embodiments of the present invention, the exemplary protection processing logic described above may be implemented as hardware, software, or any combination thereof. When implemented in software, such software may be stored to computer-readable medium (e.g., hard disk, memory, floppy disk, optical disc, etc.), and executed by a processor to receive as input the streamed information and generate the protected version of the information to be stored to the container in the manner described above.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
performing, by a computing system,
receiving a first audio signal via a first audio channel corresponding to an outbound path of a first communication device operated by a first party to a telephone call;
receiving a second audio signal via a second audio channel corresponding to an outbound path of a second communication device operated by a second party to the telephone call;
generating a control signal that includes mixing information configured to correlate the first and second audio signals;
generating an audit signal that includes an indication of audit event data detected with respect to at least one of the first or second audio signals; independently watermarking each of the first and second audio signals; and storing the first watermarked audio signal, the second watermarked audio signal, the control signal, and the audit signal in a container, wherein the audit event data includes an indication of a transfer of the container to another medium.

2. The method of claim 1, further comprising:
performing, by the computing system,
compressing the first audio signal after independently watermarking the first audio signal and prior to storing the first watermarked audio signal in the container; and
encrypting the first audio signal after independently compressing the first audio signal and prior to storing the first watermarked audio signal in the container.

3. The method of claim 2, further comprising:
performing, by the computing system,
encrypting the control signal prior to storing the control signal in the container.

4. The method of claim 1, wherein the first and second audio signals each includes a continuous stream of binary packets, and wherein the control signal includes a discontinuous stream of binary packets.

5. The method of claim 1, wherein the control signal indicates a point in time where a third party is added to the telephone call.

6. The method of claim 5, wherein the control signal indicates another point in time where at least one of the first, second, or third parties leaves the telephone call.

7. The method of claim 1, further comprising:
performing, by the computing system,
generating an application data signal that includes call detail record information with respect to the telephone call; and
storing the application data signal in the container.

8. The method of claim 7, wherein the application data signal indicates a three-way calling event occurring during the progress of the telephone call.

9. The method of claim 7, wherein the application data signal includes audit information regarding an access to the telephone call, the access occurring during the progress of the telephone call.

10. The method of claim 7, wherein independently watermarking each of the first and second audio signals comprises watermarking at least one of the first or second audio signals based, at least in part, upon the application data signal.

11. The method of claim 1, further comprising:
performing, by the computing system,
generating an external data signal that includes location information with respect to at least one of the first or second party to the telephone call; and
storing the external data signal in the container.

12. The method of claim 11, wherein the external data signal includes a video image obtained during the progress of the telephone call.

13. The method of claim 1, further comprising:
performing, by the computing system,
generating a word spotting signal that includes an indication of a keyword detected in at least one of the first or second audio signals; and
storing the word spotting signal in the container.

14. The method of claim 1, further comprising:
performing, by the computing system,
generating a voice identification signal that includes an identification of a voice detected in at least one of the first or second audio signals; and
storing the voice identification signal in the container.

15. The method of claim 1, further comprising:
performing, by the computing system,
generating a key signature signal that includes a key used to sign or encrypt the container; and
storing the key signature signal in the container.

16. The method of claim 1, further comprising:
performing, by the computing system,
retrieving the first watermarked audio signal from the container; and
enabling review of a background sound present in the first watermarked audio signal without interference from the second watermarked audio signal, thereby enabling identification of the first communication device as the source of the background sound.

17. The method of claim 1, wherein the first party to the telephone call is a resident of a controlled-environment facility, and wherein the second party to the telephone call is a non-resident of the controlled-environment facility.

18. A system, comprising:
a processor; and
a memory coupled to the processor, wherein the memory is configured to store program instructions, and wherein the program instructions are executable by the processor to cause the system to:
receive a first audio signal via a first audio channel corresponding to an outbound path of a first communication device operated by a first party to a telephone call, wherein the first audio signal includes a first continuous stream of data packets, and wherein the first party is a resident of a controlled environment facility;
receive a second audio signal via a second audio channel corresponding to an outbound path of a second communication device operated by a second party to the telephone call, wherein the second audio signal includes a second continuous stream of data packets, and wherein the second party is a non-resident of the controlled environment facility;
generate a control signal that includes mixing information configured to correlate the first and second audio signals, the control signal including a discontinuous stream of binary packets;
generate an audit signal that includes an indication of audit event data detected with respect to at least one of the first or second audio signals; watermark each of the first and second audio signals independently; and
store the first watermarked audio signal, the second watermarked audio signal, the control signal, and the audit signal in a container, wherein the audit event data includes an indication of a transfer of the container to another medium.

19. The system of claim 18, wherein the program instructions are further executable by the processor to cause the system to:
compress the first audio signal after independently watermarking the first audio signal and prior to storing the first watermarked audio signal in the container; and
encrypt the first audio signal after independently compressing the first audio signal and prior to storing the first watermarked audio signal in the container.

20. The system of claim 18, wherein the control signal indicates a first point in time where a third party is added to the telephone call and a second point in time where at least one of the first, second, or third parties leaves the telephone call.

21. The system of claim 18, wherein the program instructions are further executable by the processor to cause the system to:
generate an application data signal that includes call detail record information with respect to the telephone call; and
store the application data signal in the container.

22. The system of claim 21, wherein the application data signal indicates a three-way calling event occurring during the progress of the telephone call.

23. The system of claim 21, wherein to watermark each of the first and second audio signals, the program instructions are further executable by the processor to calculate a watermark for at least one of the first or second audio signals based, at least in part, upon the application data signal.

24. The system of claim 18, wherein the program instructions are further executable by the processor to cause the system to:
generate an external data signal that includes location information with respect to at least one of the first or second party to the telephone call; and
store the external data signal in the container.

25. The system of claim 18, wherein the program instructions are further executable by the processor to cause the system to:
generate a word spotting signal that includes an indication of a keyword detected in at least one of the first or second audio signals; and
store the word spotting signal in the container.

26. The system of claim 18, wherein the program instructions are further executable by the processor to cause the system to:
- generate a voice identification signal that includes an identification of a voice detected in at least one of the first or second audio signals; and
- store the voice identification signal in the container.

27. The system of claim 18, wherein the program instructions are further executable by the processor to cause the system to:
- generate a key signature signal that includes a key used to sign or encrypt the container; and
- store the key signature signal in the container.

28. The system of claim 18, wherein the program instructions are further executable by the processor to cause the system to:
- retrieve the first watermarked audio signal from the container; and
- enable review of a background sound present in the first watermarked audio signal without interference from the second watermarked audio signal, thereby enabling identification of the first communication device as the source of the background sound.

29. A tangible computer-readable storage medium having program instructions stored thereon that, upon execution by a computing system, cause the computing system to:
- receive a first audio signal via a first audio channel corresponding to an outbound path of a first communication device operated by a first party to a telephone call, the first audio signal including a first continuous stream of data packets, wherein the first audio signal includes a second continuous stream of data packets, and wherein the first party is a resident of the controlled environment facility;
- receive a second audio signal via a second audio channel corresponding to an outbound path of a second communication device operated by a second party to the telephone call, the second audio signal including a second continuous stream of data packets, wherein the second audio signal includes a second continuous stream of data packets, and wherein the second party is a non-resident of the controlled environment facility;
- generate a control signal that includes mixing information configured to correlate the first and second audio signals, the control signal including a discontinuous stream of binary packets;
- generate an application data signal that includes call detail record information with respect to the telephone call;
- generate an external data signal that includes location information with respect to at least one of the first or second party to the telephone call;
- generate an audit signal that includes an indication of audit event data detected with respect to at least one of the first or second audio signals; watermark each of the first and second audio signals independently; and store the first watermarked audio signal, the second watermarked audio signal, the control signal, the application data signal, the external data signal, and the audit signal in a container, wherein the audit event data includes an indication of a transfer of the container to another medium.

30. The tangible computer-readable storage medium of claim 29, wherein the control signal indicates a first point in time where a third party is added to the telephone call and a second point in time where at least one of the first, second, or third parties leaves the telephone call.

31. The tangible computer-readable storage medium of claim 29, wherein the application data signal indicates a three-way calling event occurring during the progress of the telephone call.

32. The tangible computer-readable storage medium of claim 29, wherein the program instructions, upon execution by the computing system, further cause the computing system to:
- generate an external data signal that includes location information with respect to at least one of the first or second party to the telephone call; and
- store the external data signal in the container.

33. The tangible computer-readable storage medium of claim 32, wherein the program instructions, upon execution by the computing system, further cause the computing system to:
- generate a word spotting signal that includes an indication of a keyword detected in at least one of the first or second audio signals; and
- store the word spotting signal in the container.

34. The tangible computer-readable storage medium of claim 33, wherein the program instructions, upon execution by the computing system, further cause the computing system to:
- generate a voice identification signal that includes an identification of a voice detected in at least one of the first or second audio signals; and
- store the voice identification signal in the container.

35. The tangible computer-readable storage medium of claim 34, wherein the program instructions, upon execution by the computing system, further cause the computing system to:
- generate a key signature signal that includes a key used to sign or encrypt the container; and
- store the key signature signal in the container.

36. The tangible computer-readable storage medium of claim 29, wherein the program instructions, upon execution by the computing system, further cause the computing system to:
- retrieve the first watermarked audio signal from the container; and
- enable review of a background sound present in the first watermarked audio signal without interference from the second watermarked audio signal, thereby enabling identification of the first communication device as the source of the background sound.

* * * * *